(12) United States Patent
Hirata

(10) Patent No.: US 9,519,205 B2
(45) Date of Patent: Dec. 13, 2016

(54) PROJECTION IMAGE DISPLAY DEVICE

(71) Applicant: HITACHI MAXELL, LTD., Ibaraki-shi, Osaka (JP)

(72) Inventor: Koji Hirata, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/654,852

(22) PCT Filed: Mar. 29, 2013

(86) PCT No.: PCT/JP2013/059549
§ 371 (c)(1),
(2) Date: Jun. 23, 2015

(87) PCT Pub. No.: WO2014/155675
PCT Pub. Date: Oct. 2, 2014

(65) Prior Publication Data
US 2016/0085142 A1 Mar. 24, 2016

(51) Int. Cl.
*G03B 21/20* (2006.01)
*G02F 1/1335* (2006.01)
(Continued)

(52) U.S. Cl.
CPC ............ *G03B 21/208* (2013.01); *G02B 6/0093* (2013.01); *G02B 7/02* (2013.01); *G02B 13/0095* (2013.01);
(Continued)

(58) Field of Classification Search
CPC ... G02B 6/0096; G02B 6/0011; G02B 6/0066; G02B 6/0086; G02B 6/0093; G02B 7/02; H04N 9/3152; G03B 21/2093; G03B 21/208; G03B 21/28
(Continued)

(56) References Cited

U.S. PATENT DOCUMENTS 6,773,218 B1 * 8/2004 Mingoes ............. E04F 21/1811
254/105
7,883,218 B2 * 2/2011 Yoshikawa ............ G03B 21/16
353/122
(Continued)

FOREIGN PATENT DOCUMENTS

JP      09-222603      8/1997
JP      2000-131647    5/2000
(Continued)

*Primary Examiner* — William C Dowling
(74) *Attorney, Agent, or Firm* — Volpe and Koenig, P.C.

(57) ABSTRACT

A projection image display device includes a rod lens of rectangular cross section, into which white light from a light source enters, and exits as diffused light of uniform illumination intensity. The rod lens is provided with: only a single pair of rods which are formed by splitting the rod lens along the optical axis so as to bifurcate it along long sides of the rectangular cross section, and which have a thin filmed formed on a portion at the periphery of the mutually opposed surfaces thereof; and with a cover part that covers the outside periphery of the pair of rods, for retaining the pair of rods in such a way that the rods are opposed a slight distance apart due to the thin film formed on the mutually opposed surfaces, and that has openings formed at the light entry side and the light exit side of the rod lens.

3 Claims, 4 Drawing Sheets

(51) Int. Cl.
  *F21V 8/00* (2006.01)
  *G02B 7/02* (2006.01)
  *G02B 13/00* (2006.01)
  *G02B 13/16* (2006.01)
  *G03B 21/00* (2006.01)

(52) U.S. Cl.
  CPC ............ *G02B 13/16* (2013.01); *G02F 1/1336* (2013.01); *G03B 21/006* (2013.01); *G03B 21/2026* (2013.01)

(58) Field of Classification Search
  USPC .................. 385/133, 901; 362/551, 561, 559
  See application file for complete search history.

(56) References Cited

U.S. PATENT DOCUMENTS

| | | | | |
|---|---|---|---|---|
| 2005/0111818 A1* | 5/2005 | Wang | ............... | G02B 6/4298 385/147 |
| 2006/0170873 A1 | 8/2006 | Kato | | |
| 2007/0153547 A1 | 7/2007 | Liu | | |
| 2009/0244494 A1 | 10/2009 | Wada et al. | | |
| 2009/0262315 A1* | 10/2009 | Tseng | ............... | G03B 21/208 353/119 |
| 2011/0222023 A1 | 9/2011 | Okuda | | |

FOREIGN PATENT DOCUMENTS

| | | |
|---|---|---|
| JP | 2001-056451 | 2/2001 |
| JP | 2003-043411 | 2/2003 |
| JP | 2005-0249363 | 1/2005 |
| JP | 2006-208955 A | 8/2006 |
| JP | 2007-101711 | 4/2007 |
| JP | 2008-145838 | 6/2008 |
| JP | 4716528 | 4/2011 |
| WO | 2010/064559 A1 | 6/2010 |

* cited by examiner

FIG. 1
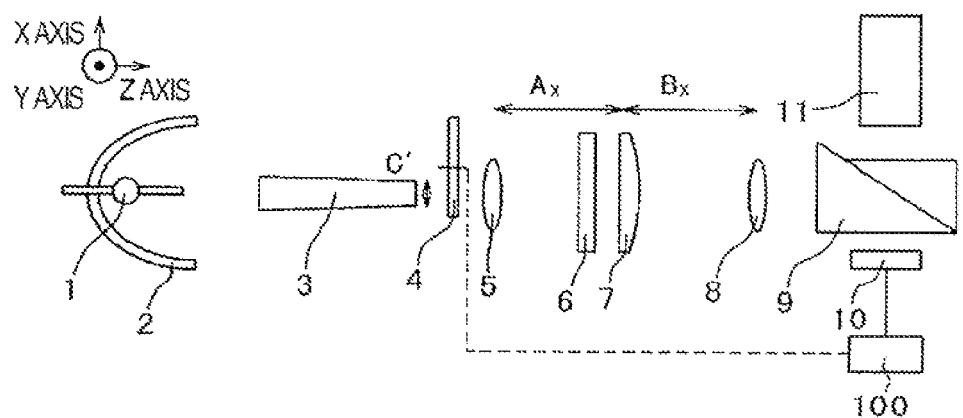
(A)
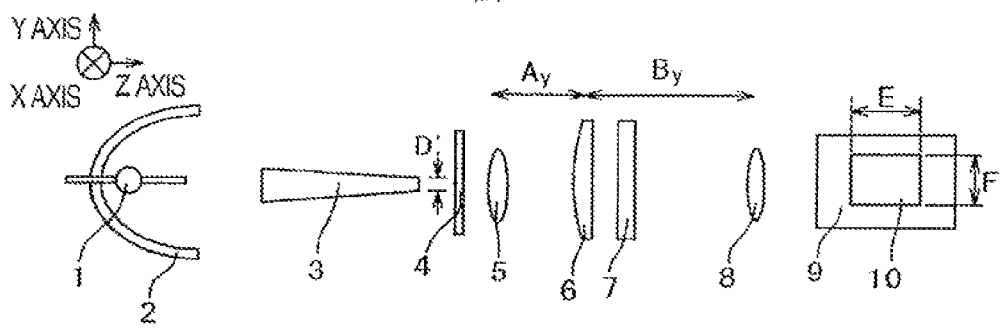
(B)

PROJECTION IMAGE DISPLAY DEVICE

TECHNICAL FIELD

The present invention relates to a projection-type image display device, and especially relates to an optical element arranged between a light source unit and a liquid crystal display element.

BACKGROUND ART

A projection-type image display device that collects white light from a light source and forms a light-emitting surface, has a rotation-type color filter arranged in the vicinity of the light-emitting surface, collects outgoing light from the color filter and allows the outgoing light to enter one sheet of optical modulation element, and projects an image formed in the optical modulation element, onto a screen through a projecting lens, is already known in PATENT LITERATURE 1 below and the like. Further, it is already known in PATENT LITERATURE 2 below that, in the projection-type image display device (or a liquid crystal display device), employing a square rod lens with a cross section having a similar figure to a display area of a display panel, in order to efficiently irradiate the display area of the display panel with the light from the light source, and having the rod lens configured from a group of a plurality of (four) divided rods around an optical axis thereof, in order to make an optical path length from a light source unit to an image display element short, thereby to downsize the entire device.

CITATION LIST

Patent Literature

Patent Literature 1: JP-B2-4716528
Patent Literature 2: JP-A-09-222603

SUMMARY OF INVENTION

Technical Problem

That is, to obtain an effect of sufficient illuminance distribution in the rod lens, it is necessary to cause the length of the rod lens to be a multiple of a predetermined value with respect to one side of the cross section shape. Therefore, there is a problem that, when the cross section of the rod lens becomes large due to employment of a large display panel, the length of the rod lens becomes large, and the entire device is increased in size. According to the rod lens configured from a group of four divided rods disclosed in PATENT LITERATURE 2, downsizing of the entire device without making the length large of the rod lens is possible. However, sufficient consideration has not been given to a mounting structure in the projection-type image display device, especially, in an optical system accompanied by a large amount of heat generation, as described below.

Therefore, the present invention has been made in view of the projection-type display device of the above-described conventional technology, and an objective is to provide a rod lens actually suitable for mounting in a projection-type image display device, and a configuration of a projection-type image display device in which the rod lens is mounted.

Solution to Problem

To solve the above-described problem, according to the present invention, there is provided a projection-type image display device including: a light source configured to radiate white light; a rod lens with a square cross section configured to have the white light from the light source enter, and to output light with uniformly dispersed illuminance; an optical modulation element arranged near an outgoing surface of the rod lens, and configured to modulate the light output from the rod lens, as incoming light, according to an image signal, to form a display image; and a projecting lens configured to enlarge and project the display image modulated in the optical modulation element, wherein the rod lens includes only a pair of rods formed divided along an optical axis to divide the rod lens into equal two parts with long sides of the square cross section of the rod lens, and having a thin film formed on a part of a periphery of mutually facing surfaces, and a cover unit that covers an external periphery of the pair of rods, holds the pair of rods to face each other, slightly separated with the thin film formed on the mutually facing surfaces, and forms openings in an incoming side and an outgoing side of the rod lens.

Advantageous Effects of Invention

According to the above-described present invention, an excellent effect to provide a rod lens suitable for mounting in an optical system irradiated with extremely intense light associated with a recent increase in light emission intensity of light sources, and a configuration of a projection-type image display device in which the rod lens is mounted is exerted.

BRIEF DESCRIPTION OF DRAWINGS

FIGS. 1(A) and 1(B) are a top view and a side view illustrating an example of a principal configuration of a projection-type image display device of an embodiment of the present invention.

DESCRIPTION OF EMBODIMENTS

Figure 2:
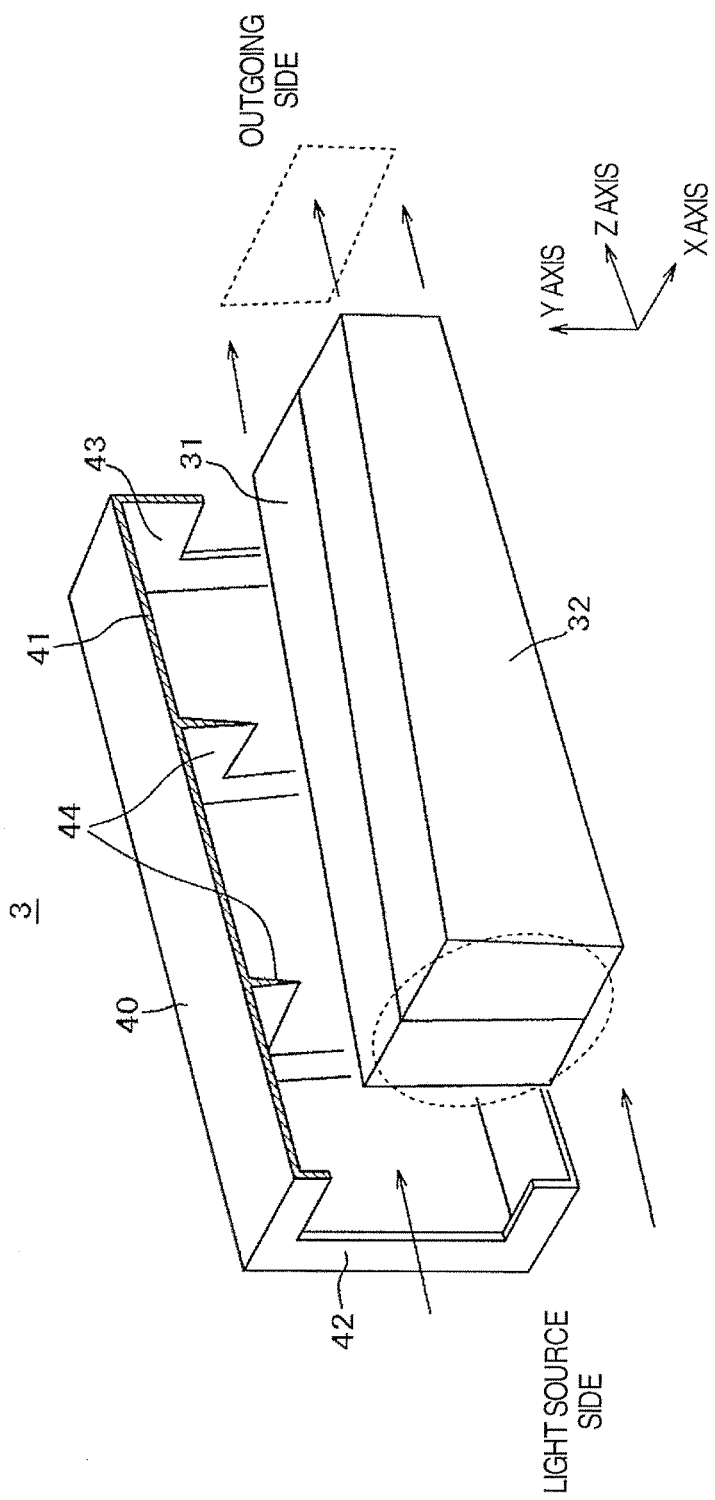
FIG. 2 is a perspective view including a partial cross section illustrating a detailed structure of a rod lens unit in the projection-type image display device.
Figure 3:
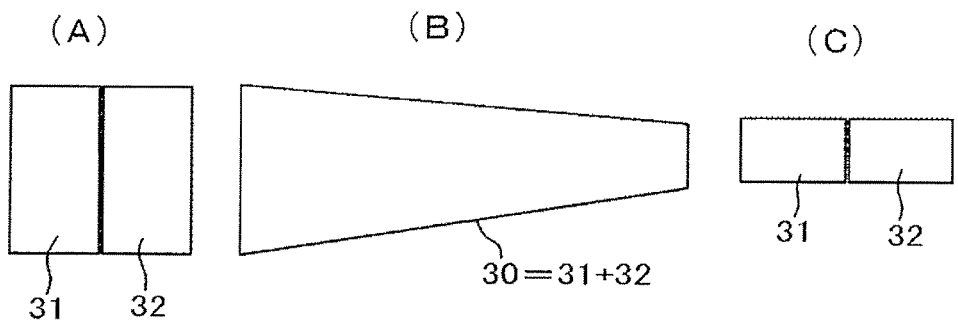
FIGS. 3(A) to 3(C) are a front view, a side view, and a back view illustrating a structure of a pair of rods that configures the rod lens unit.

Hereinafter, an embodiment of the present invention will be described in detail with reference to the appended drawings.

First, FIGS. 1(A) and 1(B) are a top view (FIG. 1(A)) and a side view (FIG. 1(B)) illustrating an example of a principal configuration of a projection-type image display device of an embodiment of the present invention, and here a local right-handed rectangular coordinate system is introduced in the drawings. That is, in FIG. 1(A), a longitudinal direction of a multiple reflection element (rod lens) is a Z axis, an axis parallel to a paper surface in a plane perpendicular to the Z axis is an X axis, and an axis running from the back to the front of the paper surface is a Y axis. Further, in FIG. 1(B), an axis parallel to the paper surface in the plane perpendicular to the Z axis is the Y axis, and an axis running from the front to the back of the paper surface is the X axis. That is, FIG. 1(A) is a top view of the projection-type image display device as viewed from the Y axis direction, and FIG. 1(B) is a side view of the projection-type image display device as viewed from the X axis direction.

In these drawings, a discharge lamp 1 and a reflector 2 configure a light source for radiating white light. Note that, as the discharge lamp 1, an ultrahigh pressure mercury lamp can be used, for example. That is, the ultrahigh pressure mercury lamp can efficiently radiate the white light, and its luminance (intensity) is extremely high and its radiated light can be efficiently collected with a mirror surface that is the reflector 2 with an excellent light collecting property. Specifically, the reflector 2 is configured from an ellipse rotation surface that is a rotated ellipse (note that, a semicircle) having a first focal point (short focal point) and a second focal point (long focal point), and has a dielectric multilayer film formed on its inner surface, the multilayer film transmitting an infrared ray and efficiently reflecting visible light. The reflector 2 reflects a visible light component toward the second focal point (long focal point), among the light radiated from the discharge lamp 1 arranged at the first focal point (short focal point).

Further, a multiple reflection element as a light-collecting optical element, that is, a rod lens 3 is arranged at a rear part of the light source in the Z axis direction, and the light emitted from the discharge lamp 1 is captured/collected by the reflector 2, and enters the rod lens 3. While a detailed configuration will be described below, an incoming surface (the left end part in the drawing) of the rod lens 3 is arranged at the second focal point (long focal point) of the ellipsoidal mirror 2, that is, in the vicinity of a position where the visible light component reflected at the reflector is collected. An emission surface of the rod lens 3 has a shape long in the X axis direction and short in the Y axis direction. An aspect ratio of the rod lens 3 is set to be the same as an aspect ratio of a reflection-type image display element 10 as an optical modulation element described below. That is, the rod lens 3 satisfies C/D=E/F where the length of the emission surface of the rod lens 3 in the X axis direction is "C" and the length of the emission surface of the rod lens 3 in the Y axis direction is "D", and the length of the reflection-type image display element 10 in the X axis direction is "E" and the length of the reflection-type image display element 10 in the Y axis direction is "F". Accordingly, light rays reflected in the rod lens 3 a plurality of times form, on the emission surface of the rod lens, light distribution with uniform intensity and a similar figure to the liquid crystal reflection-type image display element 10.

Further, in the present example, a color wheel 4 is arranged in the vicinity of the emission surface of the rod lens 3, the color wheel 4 being a rotation-type color filter. The color wheel 4 is a rotation-controllable disk-shaped color filter configured from six types of fan-shaped transmission-type color filters arranged in a circumference (rotating) direction in order, the six types of color filters respectively transmitting only R (red), G (green), B (blue), C (cyan), Y (yellow), and W (white) light. The color wheel 4 can be realized with three types of color filters including R (red), G (green), and B (blue), in place of the above-described six types of color filters.

That is, by rotating of the color wheel 4, the white light output from the light source is decomposed into the six colors (R (red), G (green), B (blue), C (cyan), Y (yellow), W (white)) in time series. Following that, the light emitted from the color wheel 4 is irradiated on the reflection-type image display element 10 through relay lenses 5 to 8 that configure an illumination optical element that collects the emission light, and then through a TIR prism 9.

Here, an operation of the relay lenses 5 to 8 that configure the illumination optical element will be described. These relay lenses serve to prevent divergence of light by collecting the light emitted from the rod lens 3 and transmitted through the color wheel 4. Further, the relay lenses serve to expand the uniform light distribution on the emission surface of the color wheel 4, onto a surface of the reflection-type image display element 10. Further, the relay lenses also serve to make light approximately parallel. Then, the TIR prism 9 totally reflects the entering light, thereby to lead the light to the reflection-type image display element 10.

The reflection-type image display element 10 is a two-dimensional optical modulation element that can control individual cells, and an image formed of these cells is expanded and projected on the screen or the like, through a projection lens 11.

The reflection-type image display element 10 is synchronized with rotation of the color wheel 4 by a control device (configured from a microcomputer and a memory) denoted with the reference sign 100 in the drawing. Accordingly, the reflection-type image display element 10 displays an image based on an image signal, for each color light of the color wheel 4, and reflects the light entering from the TIR prism 9 toward a direction of the projection lens 11. That is, the light rays reflected at the reflection-type image display element 10 become to have an angle that does not satisfy a total reflection angle of the TIR prism 9, and thus are transmitted the TIR prism 9, and enter the projection lens 11. Note that, here, an optical system from where the light is transmitted the TIR prism 9 after emitted from the color wheel 4 to where the light reaches the surface of the reflection-type image display element 10 is referred to as illumination optical system.

Next, details of the rod lens 3 will be described below with reference to the appended FIGS. 2 to 5.

Note that, in recent years, to increase luminance of a projection image to improve display performance, an increase in the light emission intensity of the light source has been enhanced. However, with the enhancement, in an optical system irradiated with extremely intense light, especially in the rod lens that allows the white light from the light source to enter, and outputs light with uniformly dispersed illuminance, a measure against the radiated light with extremely intense intensity is necessary. In addition, as described in the conventional technology, a measure against the increase in the size of the rod lens (especially, the length direction of the rod lens) associated with the increase in the size of the liquid crystal display panel as the optical modulation element is also necessary.

Therefore, the inventors have attempted various examinations, that is, the inventors have found that, when the rod lens is formed of a group of four rods that are formed to divide the cross section of the rod lens into four equal parts, as exemplarily illustrated in PATENT LITERATURE 2, an adhesive applied on a joint surface, for joining these four rods, is subject to high temperature and deteriorated, and the deterioration is led to failure of the device and the like, and becomes a major cause to shorten the product life.

Therefore, the present invention has been made in view of the problem of when the rod lens is actually mounted in the projection-type image display device, and provides a mounting structure of the rod lens in the optical system with a large amount of heat generation.

FIG. 2 is a perspective view including a partial cross section of the rod lens 3 for illustrating the entire configuration of the rod lens 3, and as is clear from the drawing, the rod lens 3 has the incoming surface (the left side in the drawing) formed into a square so as to efficiently collect circular incoming light radiated from the normal light source, and has the outgoing surface formed into a rectangle so that the aspect ratio becomes the same as that of the reflection-type image display element 10 as the optical modulation element, as described above.

Then, the rod lens 3 is configured from two (only a pair of) rods 31 and 32 divided along an optical axis of the rod lens 3 to divide the rectangular cross section of the outgoing side of the rod lens 3 into two equal parts with long sides of the rod lens 3, that is, in a vertical direction. Note that the appended FIG. 3(A) illustrates a front view of an incoming side of the pair of rods 31 and 32 that configure the rod lens 3, FIG. 3(B) illustrates a side view, and FIG. 3(C) illustrates a back view of the outgoing side of the pair of rods 31 and 32, respectively.

Further, the pair of rods 31 and 32 has mutually facing surfaces extending in an optical axis direction and held parallel to each other in a state of being slightly separated, with a thin film on a surface and a structure of a cover unit 40 described below. Accordingly, an extremely thin air layer is formed between the pair of rods 31 and 32, and the light propagated in the rods is reflected at an interface being a separation surface of these rods. Therefore, these rods 31 and 32 can be reliably separated.

Figure 4:
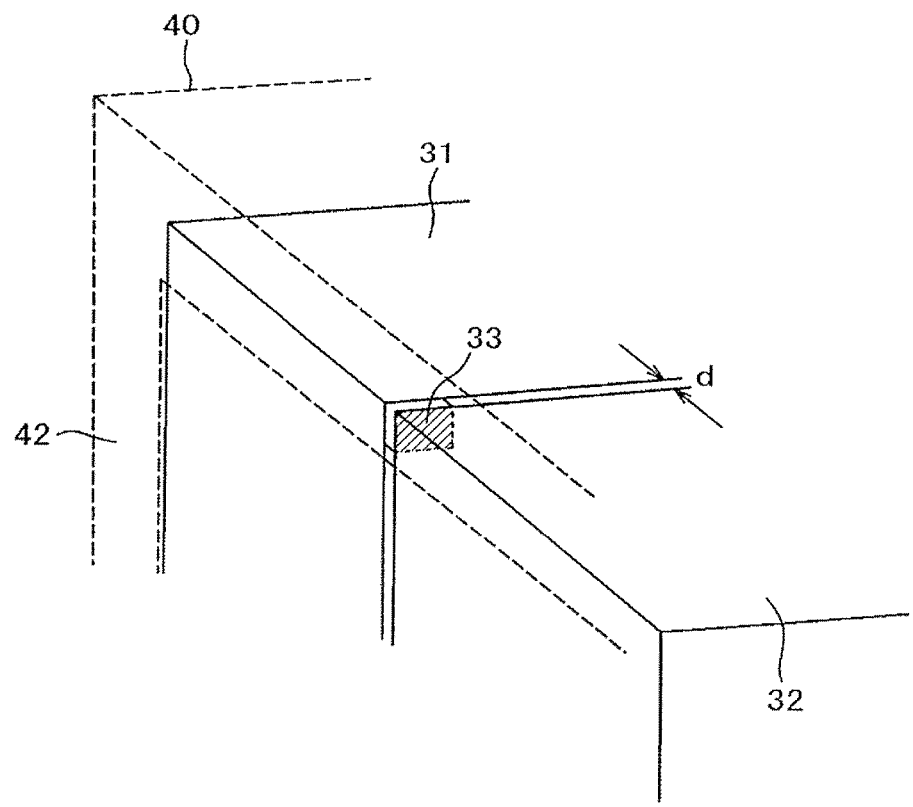
FIG. 4 is a partially enlarged perspective view including a joint part of the pair of rods.

That is, the appended FIG. 4 illustrates a perspective view of a partially enlarged joint part of the pair of rods 31 and 32. As is clear from the drawing, a thin film 33 (for example, the thickness d=5 to 20 µm) made of an Si thin film or a metal thin film (Ti, Mg, or the like) is formed on a part (a corner part) of one surface of the facing surfaces of the pair of rods 31 and 32, specifically, on square four corner parts that form the facing surface, by means of vacuum deposition or the like. That is, with the formation of the thin film 33 across the parts of the facing surfaces, the pair of rods 31 and 32 is held parallel to each other in a state of being slightly separated. The thickness of the thin film can be made small if the flatness of the joint surface of the rods 31 and 32 is high.

Further, referring back to FIG. 2, the above-described cover unit 40 includes four external walls 41 provided to cover the pair of rods 31 and 32 (only two walls are illustrated in the drawing), a frame part 42 having an opening and arranged at a light source side (that is, at the incoming side), a frame part 43 having an opening and arranged at the outgoing side (that is, at a reflection-type image display element side), and a plurality of frame parts formed protruding from an inner surface of the external wall like a frame. Note that the frame part 42 arranged at the incoming side serves as a diaphragm of the incoming light with a circular cross section from the light source side to the rod lens 3. Further, tip parts of a plurality of frame parts 44 formed protruding from an inner surface of the external wall 41 are in contact with external peripheries of the pair of rods 31 and 32, and are formed tapered. That is, the plurality of holding frame parts 44 holds the pair of rods 31 and 32 at predetermined positions from the external peripheries by line con tact.

Figure 5:
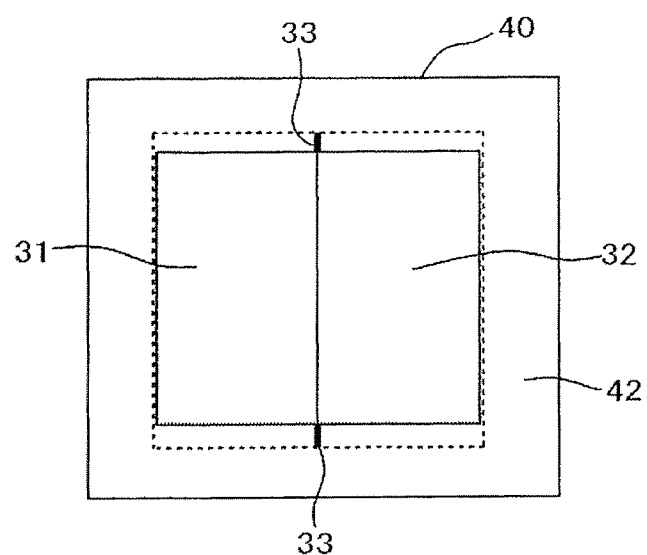
FIG. 5 is a diagram illustrating positional relationship between the rod lens unit and a cover unit that holds the rod lens unit.

Further, FIGS. 4 and 5 illustrate positional relationship between the fronts of the pair of rods 31 and 32, and the frame part 42 arranged at the light source side (incoming side) of the cover unit 40. That is, as is clear from the drawings, when the rod lens 3 is viewed from an opening side of the cover unit 40 (illustrated by the broken line in the drawing) (that is, through the frame part 42 at the incoming side), the thin films 33 formed on the facing surface of the pair of rods 31 and 32 are hidden by the frame part 42 (that is, positioned outside the opening). According to this configuration, the extremely intense light radiated from the light source and collected with the reflector is not directly irradiated on the thin films 33 formed at positions close to the incoming surface. Therefore, failure of the device and a decrease in the product life due to deterioration of the thin films 33 subject to high temperature can be prevented. Note that the cover unit 40 can be manufactured into the above-described shape by casting metal such as aluminum (Al) or magnesium (Mg).

That is, according to the above-described embodiments, a rod lens suitable for mounting in an optical system irradiated with extremely intense light associated with a recent increase in the light emission intensity of a light source, and a configuration of a projection-type image display device in which the rod lens is mounted are provided. Specifically, outgoing light with sufficient illuminance distribution (that is, uniform outgoing light) can be obtained with a length similar to a conventional one, without increasing the length of the rod lens, (that is, without increasing the size), even when the conventional reflection-type image display element (ratio=4:3) with a diagonal of 0.7 inch size is changed into a reflection-type image display element with 1.0 inch size, or when the conventional reflection-type image display element (ratio=16:9) with 0.53 inch size is changed into a reflection-type image display element with 0.97 inches, that is, when the cross section of the rod lens is increased.

Note that, in the projection-type image display device according to the embodiments of the present invention described above, a configuration has been described, which employs the reflection-type image display element, as the optical modulation element for forming a desired image with the color light from the color wheel 4. However, the present invention is not limited to the example, and can be applied to various projection-type image display devices, instead. For example, a ferroelectric liquid crystal panel as a bistable element that switches two states of ON/OFF can be used. In this case, the TIR prism 9 that configures a part of the illumination optical system would become unnecessary. In addition, in the above-described projection-type image display device, one configured from the plurality of transmission-type color filters has been described as the color wheel 4 being a rotation-type color filter. However, the present invention is not limited to the example, and reflection-type color filters can be used, instead.

Note that the present invention is not limited to the above-described embodiments, and includes various modifications. For example, detailed description has been given in the embodiments in order to explain the present invention in ways easy to understand, and the present invention is not necessarily limited to one that includes all of the described configurations. Further, a part of a configuration of a certain embodiment can be replaced with a configuration of another embodiment, and a configuration of a certain embodiment can be added to a configuration of another embodiment. Further, another configuration can be added to/deleted from/replaced with a part of a configuration of each embodiment.

REFERENCE SIGNS LIST

1 Discharge lamp
2 Reflector
4 Color wheel
5 to 8 Relay lens
9 TIR prism
10 Reflection-type image display element
11 Projection lens

3 Rod lens
31 and 32 Rod
33 Thin film
40 Cover unit
41, 42, and 43 Frame part
44 Holding frame part

The invention claimed is:

1. A projection-type image display device comprising:
a light source configured to radiate white light;
a rod lens with a square cross section configured to receive the white light from the light source enter, and to output light with uniformly dispersed illuminance;
an optical modulation element arranged near an outgoing surface of the rod lens, and configured to modulate the light output from the rod lens as incoming light according to an image signal to form a display image; and
a projecting lens configured to enlarge and project the display image modulated in the optical modulation element, wherein
the rod lens includes
only a pair of rods formed divided along an optical axis to divide the rod lens into equal two parts with long sides of the square cross section of the rod lens, and having a thin film formed on a part of a periphery of mutually facing surfaces, and
a cover unit that covers an external periphery of the pair of rods, holds the pair of rods to face each other, slightly separated with the thin film formed on the mutually facing surfaces, and forms openings in an incoming side and an outgoing side of the rod lens,
wherein the cover unit includes an external wall that covers the external periphery of the pair of rods, and a plurality of holding frame parts protruding from an inner surface of the external wall in a frame manner, and abutting on the external periphery of the pair of rods, and an opening in the incoming side of the cover unit is formed in a square manner such that the thin film formed on the facing surface of the pair of rods is positioned outside the opening when the rod lens is viewed from a side of the opening.

2. The projection-type image display device according to claim 1, wherein the thin film formed on the mutually facing surfaces of the only pair of rods that configures the rod lens is formed on a corner part of the facing surface of one of the only pair of rods.

3. The projection-type image display device according to claim 2, wherein the thin film is formed of an Si thin film or a metal thin film.

* * * * *